US008564844B2

(12) United States Patent
Brünner (10) Patent No.: US 8,564,844 B2
(45) Date of Patent: Oct. 22, 2013

(54) OUTLIER DETECTION DURING SCANNING (75) Inventor: Marvin P. Brünner, Nijmegen (NL)

(73) Assignee: OCE-Technologies B.V., Ma Venlo (NL)

( * ) Notice: Subject to any disclaimer, the term of this patent is extended or adjusted under 35 U.S.C. 154(b) by 2045 days.

(21) Appl. No.: 11/199,452

(22) Filed: Aug. 9, 2005

(65) Prior Publication Data
US 2006/0033967 A1 Feb. 16, 2006

(30) Foreign Application Priority Data

Aug. 10, 2004 (EP) .................................... 04077285

(51) Int. Cl.
*H04N 1/00* (2006.01)
*H04N 1/04* (2006.01)
*G06K 15/00* (2006.01)

(52) U.S. Cl.
USPC .......... 358/405; 358/1.12; 358/1.18; 358/474

(58) Field of Classification Search
USPC ............... 358/1.12, 1.18, 505, 405, 403, 462, 358/464, 474; 355/25; 382/176, 286–292
See application file for complete search history.

(56) References Cited

U.S. PATENT DOCUMENTS

| 6,345,130 B1 * | 2/2002 | Dahl ............................. 382/286 |
| 6,408,094 B1 * | 6/2002 | Mirzaoff et al. ............. 382/224 |
| 6,941,030 B2 * | 9/2005 | Kakutani et al. ............. 382/290 |
| 7,209,246 B2 * | 4/2007 | Suda et al. ................... 358/1.14 |
| 7,483,589 B2 * | 1/2009 | Ahmed et al. ................ 382/282 |
| 2003/0142884 A1 * | 7/2003 | Cariffe .......................... 382/285 |
| 2003/0174228 A1 * | 9/2003 | Brake et al. ............... 348/333.11 |
| 2003/0198398 A1 * | 10/2003 | Guan et al. .................... 382/255 |
| 2004/0042678 A1 * | 3/2004 | Loce et al. ..................... 382/255 |
| 2004/0170327 A1 * | 9/2004 | Kim et al. ..................... 382/217 |
| 2004/0201870 A1 * | 10/2004 | Araki ........................... 358/3.26 |
| 2006/0007345 A1 * | 1/2006 | Olson et al. ................... 348/345 |

FOREIGN PATENT DOCUMENTS

| DE | 44 05 105 A1 | 9/1994 |
| EP | 0 596 724 A1 | 5/1994 |
| EP | 0 723 247 A1 | 7/1996 |
| EP | 0 772 145 A2 | 5/1997 |
| EP | 0 922 356 B1 | 6/1999 |
| EP | 1 333 656 A2 | 8/2003 |
| WO | WO-98/09427 A1 | 3/1998 |

* cited by examiner

*Primary Examiner* — Charlotte M Baker
(74) *Attorney, Agent, or Firm* — Birch, Stewart, Kolasch & Birch, LLP (57) ABSTRACT

The scanning and processing of a multi-page document is described wherein scan images are generated by optically scanning a sequence of pages of a multi-page document such as a book, processing the scan images to generate page images corresponding to original pages of the multi-page document, e.g., by deskewing and removing black border areas, and after generating a proposed page image, it is checked to determine if there is a chance that the image contains errors, by detecting if its image parameters, such as the text area coordinates (X1, X2, X3, X4, Y1, Y2) are according to target criteria which are based on a statistical analysis of the document. If the page image satisfies the target criteria, the page image is automatically accepted, and if it does not, the page image is displayed to an operator to accept or to adjust the page image.

18 Claims, 5 Drawing Sheets

OUTLIER DETECTION DURING SCANNING

This Nonprovisional application claims priority under 35 U.S.C. §119(e) on European Patent Application No. EP 04077285.7 filed on Aug. 10, 2004 and the entire contents of which are hereby incorporated by reference.

BACKGROUND OF THE INVENTION

The present invention relates to a method of processing a multi-page document, the method including the steps of receiving scan images from optically scanning a sequence of pages of the multi-page document, and processing the scan images to generate a file of page images corresponding to original pages of the multi-page document.

The present invention also relates to a computer program product for processing a multi-page document.

The present invention further relates to a document processing system comprising a scanner unit for generating scan images from optically scanning a sequence of pages of a multi-page document, a local user interface unit, and an image processor unit for processing the scan images to generate page images corresponding to original pages of the multi-page document.

When large documents must be scanned in for archiving purposes, it is quite important that all pages of the document are scanned faultlessly, since when scan errors are later detected, the original documents may no longer be available. Therefore, it is necessary to check each scan image for quality. However, checking the quality of each scan image requires much time and effort and poses an undue burden on the personnel performing the scan job. Moreover, checking large numbers of images is boring and error-prone.

One way of circumventing the human checking process is using an automated system that automatically checks each new scan image and if possible corrects faulty images by relevant image processing techniques. A scan image that does not conform to a predetermined quality standard is hereinbelow called an "outlier".

Such a method is known from patent application WO98/09427, which describes an arrangement and a method for ensuring quality during scanning or copying. The method includes the steps of feeding in the page(s) that are to be scanned and checking the quality of the scan images in a sequence of steps, including a check of outer characteristics which is performed with respect to skew, double-feeding/overlapping, deviating shape, and geometric deformation; a check of so-called inner quality of the contents of the page, and a check of the information content quality. In each step, the measured quality is compared to a quality limit. If the measured quality is according to the limit or better, an automatic adjustment of the scan image is performed if necessary, after which the scan image is added to the scan file. If the measured quality is below the limit, the operator is requested to re-feed the page for re-scanning.

In the known system, the quality check is made on the basis of fixed, pre-programmed quality limits that may not always fit with the practical situation. If the check is negative, there is no other option than re-scanning, which forces the operator to re-feed the document. It may, however, occur that a rejected scan image is in fact still acceptable, or can be made acceptable by a small adjustment, and that re-scanning is not at all necessary.

SUMMARY OF THE INVENTION

It is an object of the present invention to provide a method and system for processing scan images to generate a sequence of page images that closely correspond to the original pages of a multi-page document, while providing a flexible option for an operator for correcting a limited number of page images based on an automatic detection of quality.

According to a first aspect of the present invention the object is achieved with a method as described in the opening paragraph, wherein the method includes the steps of automatically determining target criteria for image parameters based on page properties of the multi-page document derived during the processing of the scan images, checking if the image parameters of a page are according to the target criteria, and if so, automatically accepting the page image, and if not, displaying the page image to an operator for corrective action or accepting the page image.

According to a second aspect of the present invention the object is achieved with a computer program product for performing the method.

According to a third aspect of the present invention the object is achieved with a document processing system as described in the opening paragraph wherein the system includes outlier detection means for determining target criteria for image parameters based on page properties of the multi-page document derived during the processing the scan images, checking if the image parameters of a page are according to the target criteria, and if so, automatically accepting the page image, and, if not, displaying the page image to an operator for corrective action or accepting the page image via the user interface unit.

The measures have the following effect. The processing of a scan image results in a page image based on detected page properties. In a page image, various effects of the scanning process may be compensated for or corrected in the step of processing the scan image. The page properties and corrections are compared to the target criteria, which are established based on the statistical properties of the multi-page document itself. Hence the quality of a page image is measured relative to the properties of the document, and subsequently the page image is qualified as an outlier if a proposed processed page image deviates substantially from the target criteria. The proposed page image is displayed and the operator may then accept, or may reject, re-scan, correct or adjust the page image in corrective action. This has the advantage that the operator is required to verify only a limited number of outliers, whereas the major part of the scan images is processed automatically. Moreover, the operator may prevent rejection of a image that is, in fact, acceptable or may be adjusted or corrected.

In particular the target criteria are adjusted to the global properties of the document, and so the properties of the actual scanned multi-page document are taken into account. This advantageously improves the detection of outliers and reduces the number of correct pages that are unnecessarily classified as outlier pages. An outlier is detected if a substantial deviation is detected from the target criteria, and only then the proposed image is shown to the operator for approval or correction. Hence errors in the final set of page images are efficiently prevented by selective inspection and correction.

In an embodiment of the present method, determining the target criteria involves statistically determining a target range for at least one of the image parameters based on page properties derived during the processing of the scan images. This has the effect that the target range of expected values is statistically determined or adjusted based on properties of the scan images of the multi-page document.

In one embodiment, the image parameters include page size or text area location or dimension. Such parameters are usually consistent throughout a multi-page document like a book or magazine. Based on detecting if the image parameters, such as the detected paper size, are outside the target range of expected values, an outlier is detected and displayed for the operator.

In another embodiment of the present method the step of detecting if the image parameters are according to the target criteria involves calculating a reliability factor indicating a reliability for an adjustment made to generate the page image. A degree of reliability is calculated of a processing step such as deskew or rotation, e.g., during processing where it has been detected that the result of the proposed page image is not reliable due to unclear data. Hence the target criteria may include a minimum level of reliability.

In one embodiment, the expected values comprise prior knowledge about documents for predefined parameters of the pages of the multi-page document. The prior knowledge may be combined or verified with statistical data from the multi-page document. General properties of documents are commonly known, for example, that a text is arranged in horizontal lines. Also predefined sets of parameters may be applied or selected for appropriate documents, e.g., including vertical lines of text for Japanese documents. Using prior knowledge has the advantage that outliers may be easily detected because they deviate from the common document properties.

In another embodiment, the predefined parameters include text line orientation and the processing of the scan images includes detecting a text line orientation and correcting a skew of the scan image in dependence on the detected text line orientation. This has the advantage that a common error during scanning, i.e. a slanted position of the original page on the scanner unit, may be easily corrected.

In still another embodiment, the method includes building a composite set of page images, the composite set having logical parts corresponding to ranges of pages in the multi-page document. This has the advantage that a logical subdivision of an original document, e.g., chapters in a book, may be maintained in the composite set of page images. In a particular embodiment the method includes receiving a command from the operator for indicating that a subset of scan images constitutes a logical part of the composite set of page images. This has the advantage that the operator may easily enter the command during scanning at the moment that a coherent range of pages of the original document is started and/or completed.

BRIEF DESCRIPTION OF THE DRAWINGS

These and other aspects of the present invention will be apparent with reference to the examples in the following description and with reference to the accompanying drawings, wherein.

DETAILED DESCRIPTION OF THE INVENTION

The Figures are diagrammatic and not drawn to scale. In the Figures, elements which correspond to elements already described have the same reference numerals.

Figure 1:
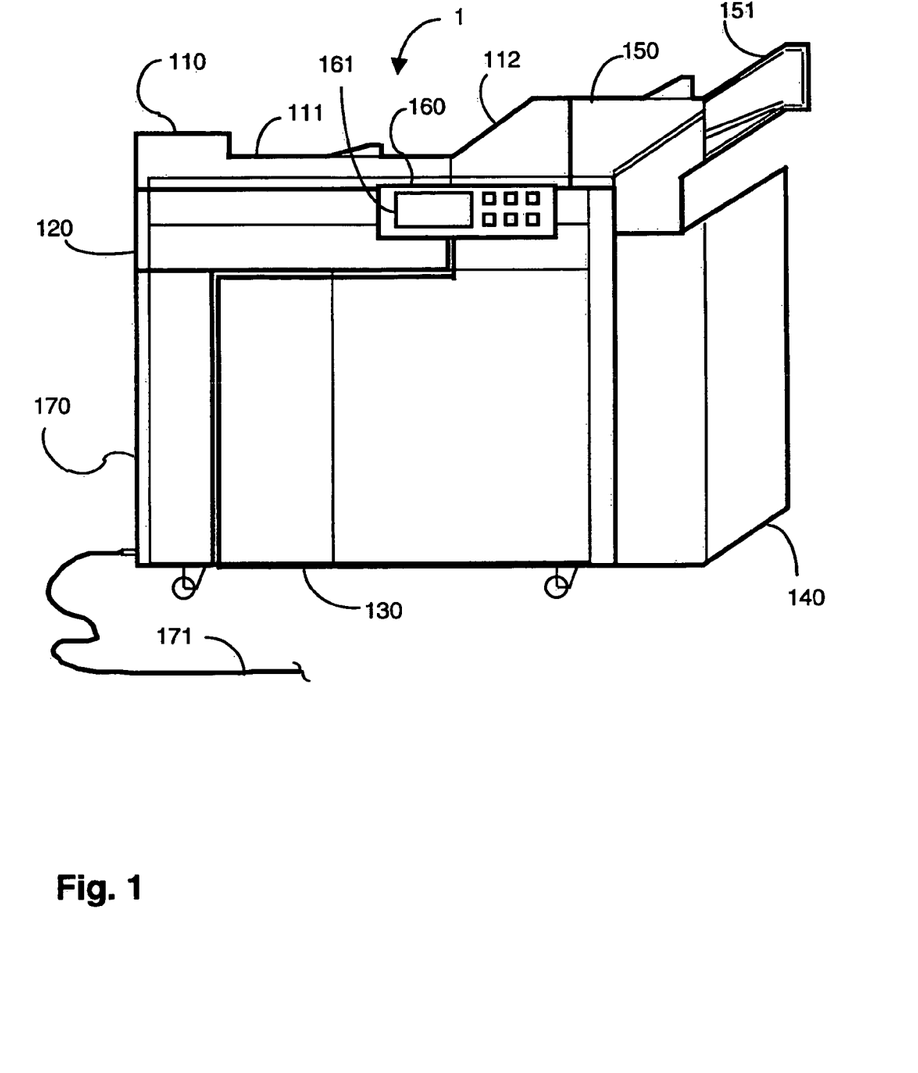
FIG. 1 shows an apparatus for processing documents.

FIG. 1 shows an apparatus for processing documents, on which the different parts are separately shown in schematic form. The documents are usually paper documents, but may include any type of sheets for carrying information, e.g., overhead sheets, books, drawings, etc. The apparatus 1 for processing documents may be a scanner only, but preferably is a multi-functional device further including printing, copying or faxing functions, e.g., a versatile copier. A scanner unit 120 includes a flat bed scanner provided with a glass platen on which an original document can be placed, a CCD array and an imaging unit having a movable mirror and lens system for imaging the document on the CCD array. In these conditions, the CCD array generates electrical signals which are converted into digital image data in a manner known per se. A document feeder 110 may be provided with an input tray 111 for the introduction of a stack of documents, a transport mechanism (not shown) for transporting the documents one by one along a scanner unit 120, and a delivery tray 112, in which the documents are placed after scanning.

Multi-page documents to be scanned may be entered via the document feeder when appropriate. For example books or magazines may be entered manually on the platen. Further scanning aids, e.g., automatically turning pages of a book, may be provided for multi-page documents.

The apparatus may have a printer unit 130, for example including an electro-photographic processing section known per se, in which a photoconductive medium is charged, exposed via an LED array in accordance with digital image data, and is developed with toner powder, whereafter the toner image is transferred and fixed on an image support, usually a sheet of paper. A stock of image supports in different formats and orientations is available in a supply section 140. The image supports with the toner image are transported to the finishing and delivery section 150, which if necessary collects them into sets and staples them and then deposits them in the delivery tray 151.

A control unit of the apparatus is shown diagrammatically by reference 170. The function of processing the scan images according to the invention is explained in more detail below with reference to FIG. 5. A cable 171 may connect the control unit 170 to a local network. The network may be wired, but may also be partly or completely wireless.

The apparatus has a user interface 160, for example including an operator control panel provided on the apparatus for the operation thereof. The user interface is provided with a display 161 and keys. The operation of the display for controlling the document processing is described below.

It is noted that in a document processing system according to the present invention the scanning may be performed in a separate device, while the image processing as described below is performed in a processor unit having a display and an operator interface, e.g., a user workstation. The processor may be built as dedicated hardware units, or may include standard processing units and software programs to implement the image processing and correction functions described below.

Figure 2:
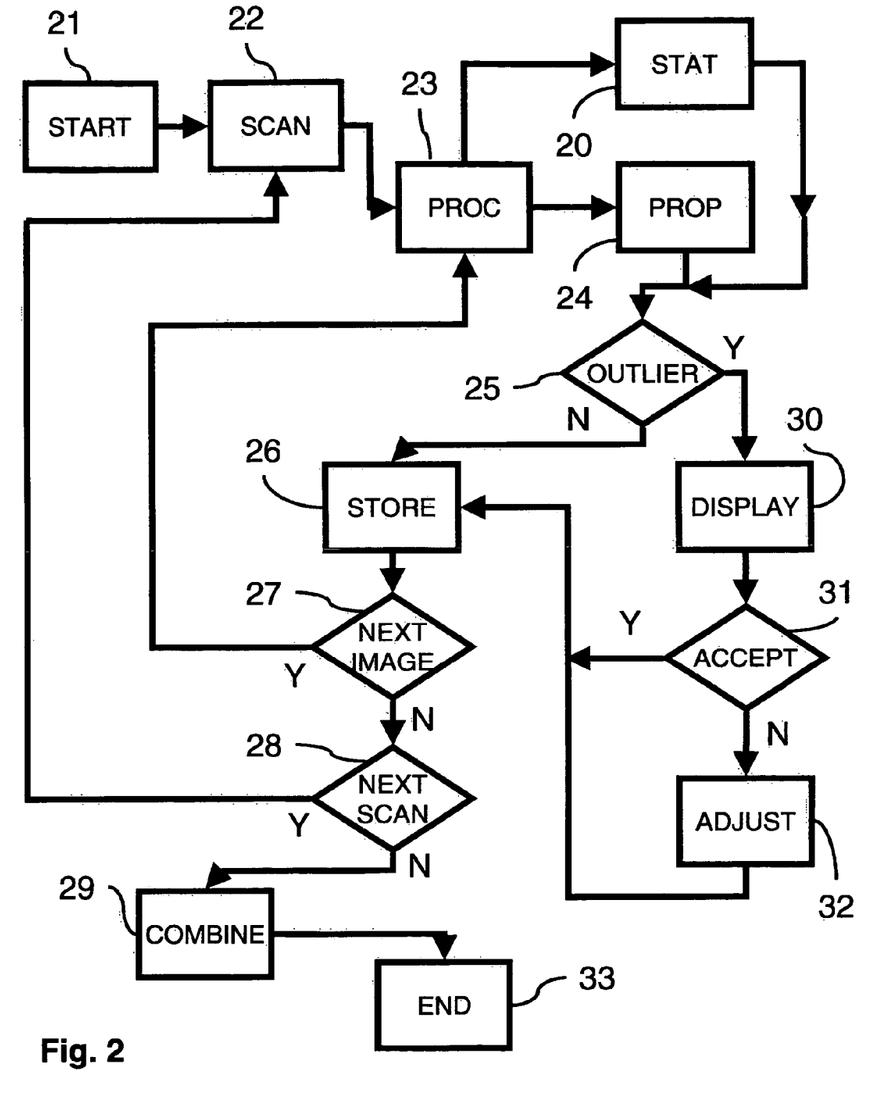
FIG. 2 shows a method of scanning a multi-page document.

FIG. 2 shows a method of scanning a multi-page document. In a first phase the method starts at START 21 with optically scanning the multi-page document in step SCAN 22. The scanning may be performed for the complete document, or for the document in parts. For each scan operation a scan image is generated by positioning a new original page on the scanner or, for a book, a dual page on the platen of the scan unit. Scan images containing two pages are called dual scan images. In special cases a scan image may contain a higher number of sub-images to be automatically processed to separate page images. The scan images may be directly processed or stored as intermediate files, or may be included in a final file, e.g., to maintain the raw source material as well.

In next step PROC 23 the scan images from scanning a sequence of pages of the multi-page document are received and processed to generate page images corresponding to the original pages of the multi-page document. For each scan image a number of processing steps are performed for retrieving a page image, or two page images in the event of a dual scan image. The page image is a representation of the original page, i.e. a processed version of the scan data provided by the scan image. Several examples of processing the scan image to a page image are given below.

According to the present invention during processing in step PROC 23 statistical information STAT 20 is gathered, which statistical information is used to determine target criteria for image parameters based on page properties of the multi-page document derived during the processing of the scan images. For example expected values for properties like paper size, text area dimensions and contrast may be determined. The target criteria are expected values and tolerances for predetermined image parameters based on the properties statistically determined, e.g., the average or the median and a tolerance based on the variance.

It is noted that at least a number of pages need to be processed first for the statistical parameters to be reliably determined. Hence an initial part of the multi-page document (at least a few pages, but preferably a substantial part of the document or even the entire document) needs to be available (i.e. scanned and stored), and is processed before the outlier detection as described below is started. As a consequence, if the said initial part of a multi-page document comprises 10 pages and, for example, the first or second scan image proves to be an outlier, it is presented with a delay of 10 pages. After the initial part has been processed, further scan images may be tested for outliers without delay. The statistical parameters initially determined may be refined during the processing of the remaining parts of the document. Alternatively the complete multi-page document may be scanned and stored, and the full set of scan images may be processed in an initial nun to determine the statistical parameters, and in a second run the outliers are detected based on the statistics of the complete document.

The processing step 23 generates, in step PROP 24, a proposed page image by the enhancement or correction processing functions based on detected image parameters. Several examples of such processing function are given below.

In a next step OUTLIER 25, it is determined if the page image is an outlier, i.e. if the image page has properties or image parameters that substantially deviate from the target criteria based on the statistical information 20. The page image is evaluated by determining if the image parameters are outside the target criteria.

If the page image is not an outlier the process is continued at step STORE 26 by automatically accepting the page image. However, if the page image is detected to be an outlier, the process is continued by an interaction with the operator as follows. In step DISPLAY 30 the page image is displayed for the operator. Hence the operator can visually inspect the proposed page image, i.e. the result of the processing. If the proposed page image is acceptable for him, the operator commands to accept the proposed page image at step ACCEPT 31. If the result is not acceptable, the processing of the page image can be manually adjusted in step ADJUST 32. For example if a wrong text area has been proposed, part of the scan image, including edges of the original text, may be cut off, and the operator may adjust the text area borders of the proposed page image. Subsequently the adjusted or accepted page image is stored in step STORE 26.

Finally, if the available scan images have been processed as detected in step NEXT IMAGE 27 and no further pages or parts of the document need to be scanned as detected in step NEXT SCAN 28, the resulting page images are combined to a multi-page digital output document of the original multi-page document in step COMBINE 29, e.g., stored in a file. It is noted that the step NEXT SCAN 28 may be omitted if the process is batch oriented and requires the complete document to be scanned before processing starts. The process is finished by delivering the output document file to END 33.

In an embodiment of the present method, the step of determining the statistical values for the image parameters in step PROC 23 includes the following: A page-edge detector detects the strongest edges in a scan and selects four edges forming a bounding box which size comes closest to a page area. The parameters and properties related to paper size detected for individual pages are statistically analyzed, e.g., averaged, and the resulting paper size features of the original pages are estimated. Subsequently expected values for the parameters or properties are stored as paper size criteria to be compared with further pages of the multi-page document.

The target criteria includes a target range for at least one of the image parameters based on page properties derived during the processing of the scan images. For example the image parameters may include a text area location. The text area parameters are usually consistent within a range for a multi-page document. Also more detailed features, like the location of page headers or footers, or a sequence of page or chapter numbers, may be separately detected and stored as expected values. Hence a missing page may be detected.

In addition to expected values based on statistically analyzed properties of the scan images, the processing in step PROC 23 may include prior knowledge about documents, i.e. predefined parameters or properties of the pages of the multi-page document are assumed to be present. For example many scanned documents have a standard paper size like A4 or Letter size. A practical example of a predefined parameter is the text line orientation, i.e., the assumption that text is aligned in lines in a direction parallel to a paper edge, and is considered to be arranged as horizontal lines of upright characters. Hence from a detected angle of the text lines it is assumed that the original page is scanned in a slanted position, and has to be rotated until the text line orientation is horizontal, i.e., the so called skew is zero. Subsequently the processing of the scan images includes detecting the text line orientation and correcting the skew of the scan image in dependence on the detected text line orientation.

A further embodiment of the present method is enabled to deal with multiple original pages in a scan image, in particular two pages in a dual scan image of books or magazines. Hence the dual scan image contains a spine of the multi-page document, and the pages are located on both sides of the spine.

Figure 3:
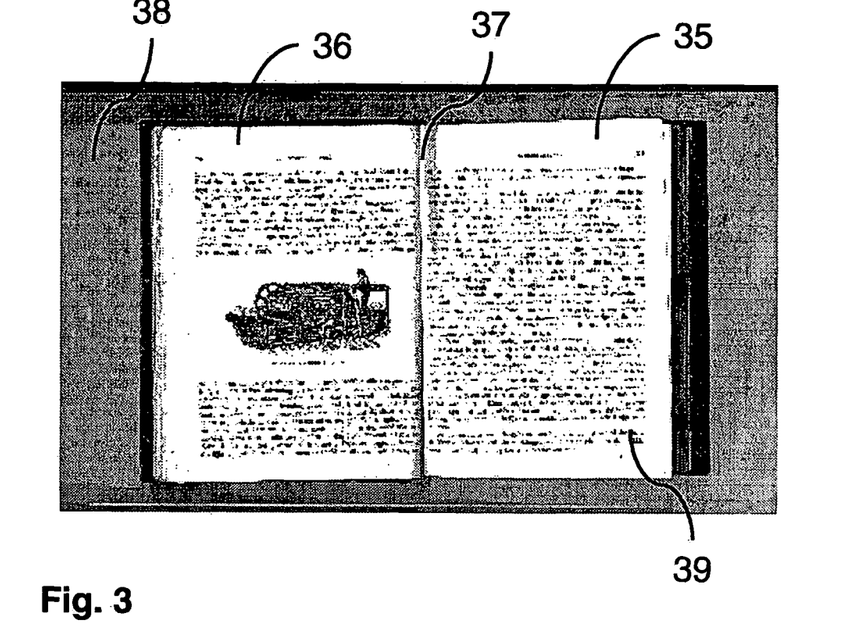
FIG. 3 shows an example of a scan image of a book.

FIG. 3 shows an example of a scan image of a book. The scan image is a dual scan image of two pages 35,36 of a book. The pages were scanned in at 300 DPI (dots per inch), in 256 gray levels, whereas the Figure has a reduced resolution. The scan image contains a black or gray border area 38, which should be removed as it is not part of the original pages. The line between the pages, the so called spine 37 of the multi-page document, is to be detected to separate both pages. A text area 39 is available on each page, but may also be used to include pictures of may be unused, i.e., white, on some pages. The paper size may be detected from the boundaries of the white areas of the pages 35,36. It is to be noted that the amount of paper hidden in the book spine may vary due to the way of positioning the book. Such varying amount may be compensated by reconstructing an original page having suitable page margins at both the left and right edges, for example by centering the text area 39 independently of the book spine.

In the method as shown in FIG. 2 the step PROC 23 of processing the scan images may contain detecting a multi-page document spine and generating two page images from a single scan image. The detection that the original document may be automatic, e.g., based on the presence of a spine, parallel text areas, and/or the detected paper size in combination with text line orientation. Alternatively, the operator may enter a command to indicate that a spine type multi-page document is to be scanned and processed.

In an embodiment of step PROC 23, the processing of the dual scan images includes, independently for each of said two pages, detecting the text line orientation. It is noted that the slant angle of both pages may be different due to the way of positioning the book. Hence, by detecting and correcting the skew of both parts of the dual scan image in dependence of the detected text line orientation, both image pages are processed individually to have zero skew.

A further property of multi-page documents is that each page has a correct, so called upright, orientation. However, during scanning, the multi-page document may be in an upside down or sideways orientation. During processing the orientation of the original page on the scan image may be detected, and an upside up page image is generated from a differently oriented scan image by appropriate rotation. The page orientation may be detected by page layout properties like top or bottom margin, page numbers, etc. In a particular example, detecting a page orientation is based on detecting text and determining properties of the text.

Figure 4:
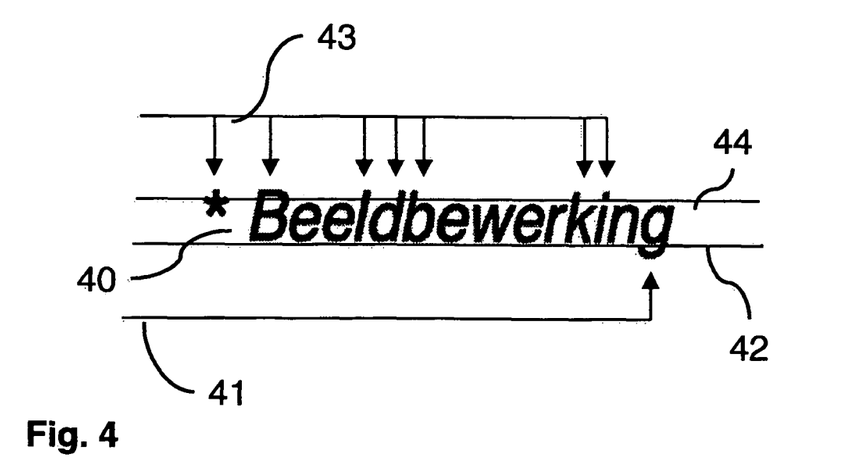
FIG. 4 shows properties of a text for detecting orientation.

FIG. 4 shows properties of text for detecting orientation, in particular upside down detection. A text fragment 40 is analyzed, and characters that extend below a bottom base line 42, called descenders 44, and characters that extend above the top base line 44 are called ascenders 43. In general there is a ratio for ascenders and descenders, e.g., for Latin languages certain ratios are to be expected. Such prior knowledge may be used as a starting value. The ratio for a particular document may be statistically determined or adjusted during processing the scan images. The target ratio is applied to detect whether a document bitmap (page area inside the scan image) is upside down or straight, and to determine the reliability of the detected orientation. Each character is classified to be an ascender, descender or none. For example, if the ratio of ascenders and descenders for a complete page is near the target ratio, then the page is straight. If the ratio is near the inverse target ratio, the page is upside-down and rotation by 180 degrees is performed to correct the page. If the ratio of the (corrected) page substantially deviates from the target ratio, an outlier is detected.

Also other properties of characters may be used to detect text orientation. For example, determining the orientation of selected characters such as the character i provides a text orientation parameter.

The step OUTLIER 25 in the method as shown in FIG. 2 is for detecting if the image parameters are outside target criteria. The target criteria may include reliability criteria as follows. During the processing of various corrections and adjustments in step PROC 23, a reliability factor is calculated that indicates the reliability that an adjustment made to generate the page image is correct. For example, the amount of text lines on a page may be very small. Hence the text line orientation or character features as detected may be less reliable, and the reliability factor will be low. Also the paper edges as detected may show gray areas, e.g., due to the paper of the original multi-page document not being completely pressed flat on the platen. Hence, from the presence of the gray picture elements (pixels) near the detected paper edges, a low reliability of the paper edge or orientation is assumed and a low reliability factor is calculated.

Figure 5:
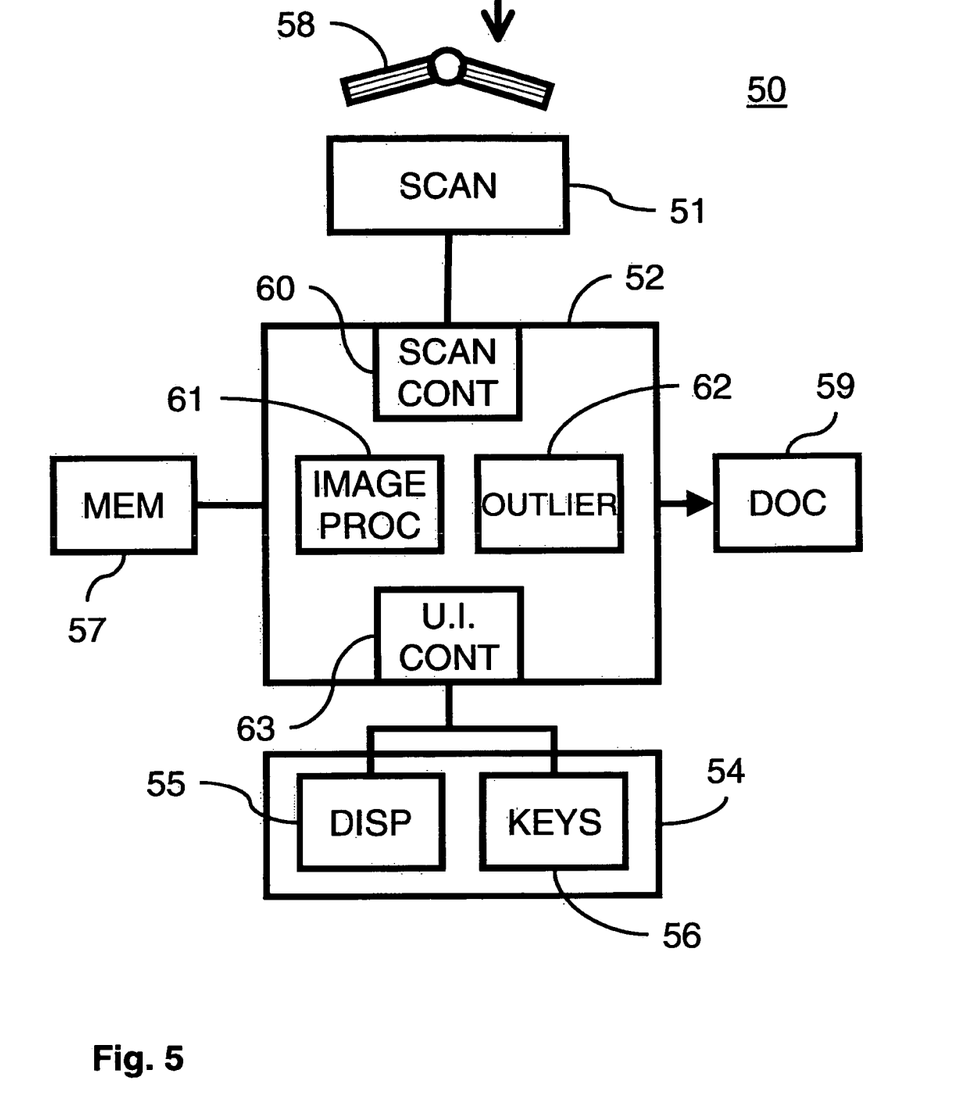
FIG. 5 shows a diagram of the constituent parts of a document processing system,
FIG. 6 show the result of detecting a text area location.

FIG. 5 shows a diagram of the constituent parts of a document processing system. The document processing system 50 has a scanner unit 51 for generating scan images from optically scanning a sequence of pages of a multi-page document 58. The scanner unit may be part of a scanning and processing apparatus, or may be a separate scanner device. The document processing system 50 has a control unit 52 coupled to the scanner unit 51, a local memory 57 and a user interface 54 including a display 55 and user command elements 56 such as keys, menu control via a cursor, a touch screen, etc. The memory may include solid state memory, a magnetic disc, etc. The processor unit includes a scan control unit 60 for controlling the receiving of scan images, a user interface control unit 63 for communicating with an operator via the user interface 54, and an image processor unit 61 and an outlier detection unit 62 for generating an output document 59 containing page images that have been processed and have been checked to be within expected target ranges of image characteristics, and optionally adjusted by an operator.

The image processor unit 61 processes the scan images to generate page images corresponding to original pages of the multi-page document. The outlier detection unit 62 detects if a page image is an outlier by detecting if image parameters are outside a target range of expected values. Subsequently, the outlier detection unit automatically accepts the page image if the page image is not an outlier. If the page image is an outlier, the page image is displayed on display 55 for an operator to accept or to adjust the page image via the user command elements 56 on the user interface unit 54.

In the system 50 the image processor unit may use prior knowledge or may be arranged for determining the expected values for the image parameters as described above. In particular the expected values may be based on page properties derived during the processing the scan images, such as an average paper size. The system 50 may be arranged for building a composite set of page images in the output document 59. The composite set has a structure of logical parts corresponding to ranges of pages in the multi-page document, e.g., chapters and annexes. The local user interface unit 54 has controllable elements, such as an import button, for receiving a command from the operator for indicating that a subset of scan images constitutes a logical part of the composite set of page images. In an embodiment the system includes a printer unit (not shown) for printing the page images, or any other printing job as requested.

In a practical embodiment the workflow to generate the output document may be as follows. The processing of a multi-page document such as a book starts with a directory containing scan images and a table in the form of a comma separated text file. The table provides control data for a sequence of scan images and each line has several fields: the type of image—color or black and white; page number of the left page; page number of the right page; and a file name of the scan image containing both pages. The following consecutive steps are performed to process the scan images: deskew each image and save both a locally adaptive thresholded (bi-level) image and gray-level image; find the paper edges on the scan image, and a book spine; find the text areas of both left and right page; detect outlying parameters, e.g., possible errors in the orientation or text area selections; pop up a user interface for correcting errors; cut out the page images from the scan image by eliminating black/gray areas not corresponding to paper areas of the original multi-page document; and finally produce a file, for example in a well known publication format like PDF (Portable Document Format), or HTML (Hyper Text Markup Language).

For the deskew process a bi-level image is created, for example with the Niblack method, described in "Digital Image Processing, page 115, W. Niblack, Prentice Hall 1986." The binarisation algorithm by Niblack is a local adaptive method. For a window of size (n*n), both mean and standard deviation (stdev) are calculated. The size of the window (n) my for example be set to 31. If text is darker than the background, the following formula is used to calculate the threshold value for the center pixel:

Threshold=mean(window)−0.18*stdev(window).

This algorithm is very useful when images should not be dithered or have low contrast, due to bad illumination, or due to aging of the original. If the background is darker than the characters, the −0.18 factor must be +0.18. The bi-level image is used to detect the angle of elements in the scan image, such as text lines or paper edges. The bi-level image may also used for OCR and text area location.

Various methods for deskewing relatively small angles (e.g., up to 30 degrees) are commonly used in image processing and calculate a histogram of angles. The histogram quality, e.g., a lack of clear peaks, may indicate when a suggested angle is not reliable. A reliability parameter may be derived and used for outlier detection. Note that deskewed pages may be upside down, as the initial skew detection algorithm is not aware of that. An improvement may be achieved by using previous scan images, e.g., by an additional rule implementing: if the histogram quality is too low, then rotate this page the same as the previous pages. If the quality remains low, an outlier is detected, and the scan is displayed for the operator to decide As part of deskewing the orientation of the pages is detected, for example as described with reference to FIG. 4. Rotation over 90 or 180 degrees of the scan image or individual pages on the scan image may be required to achieve an upright orientation of the page images to compensate for the differently positioning of the original multi-page document. Note that in some cases the pages needs to be deskewed individually, or may have a different orientation. However, deskewing may fail if the scan image contains disturbing elements like pen strokes of figures. A reliability factor to be used for outlier detection may be determined from the spectrum of angle indicators generated during the deskew process.

Detecting the paper edges and book spine may be performed as follows. The first step is to remove characters by a morphological filter, a closing operation (basic image proceeding to fill small openings by dilation followed by erosion) with a 9×9 kernel. Then a Sobel filter is used (derivative calculation based on differences between pixels in n×n kernel) on the image, resulting in the approximate derivative of the image having strong components at the borderlines between white and black areas. Next a fixed threshold is applied to the image and results in binary candidate book-edges. Although the morphological filter removes most characters and therefore false edges, figures present in the book will still generate false book-edge candidates. These candidates may be removed by applying cleanup rules, e.g., the following rule on eight-connected components. If the coverage of an object is more than a fifth of the total area, and the aspect ratio is less than 10, then the object is a false candidate for paper edges or book spine and is removed. Such a rule also removes 'blobby' objects and maintains elongated shapes, or parts of an outline.

In general the resulting image contains only a number of lines near the book-edges, and near the book spine. To locate these lines, a Hough transform is calculated and represents the image in an angle domain as follows. Straight lines are used to build a spectrum of angles, and are parameterized in the form:

$\rho = x \sin(\theta) + y \cos(\theta)$

Here, $\rho$ is the perpendicular distance from the origin and $\theta$ is the angle with the normal. Collinear points $(x_i, y_i)$, with i=1, . . . N, are transformed into N sinusoidal curves in the $(\rho, \theta)$ plane, which intersect in the point $(\rho, \theta)$. In the Hough-plane, for example ten maxima near $\theta = 0°$ give ten vertical edge candidates, and twenty maxima near $\theta = 90°$ give twenty horizontal edge candidates. More horizontal candidates are selected because the book spine edge must also be detected. From this set of lines, four are selected to form an outline of which size is closest to the expected size of the book. From the set of horizontal lines, the candidate that comes closest to the middle of the selected top and bottom book-edge is selected as the book spine. Based thereon two pages can be cut out, and further processed. If no suitable lines can be selected, or if the proposed cut-out pages deviate too much from the target range of page sizes, an outlier is detected, and shown to the operator for further handling.

A novel method to find the paper area and the middle is based on the whiteness of the paper. The gray deskewed image is used as input, and first the character objects are removed by a closing operation. The outcome is thresholded by an isodata algorithm to generate a binary image, for example as follows.

An iterative technique for choosing a threshold is described by T. W. Ridler and S. Calvard in "Picture Thresholding Using an Iterativ [sic] Selection Method, IEEE Transactions on Systems, Man and Cybernetics, Volume SMC-8, No. 8, pp. 630-2, August 1978". The histogram is initially segmented into two parts using a starting threshold value t such as $t = 2^{B-1}$, one-half the maximum dynamic range. The sample mean of the gray values associated with the foreground pixels (mf) and the sample mean of the gray values associated with the background pixels (mbkg) are computed. A new threshold value t is now computed as the average of these two sample means. The process is repeated, based upon the new threshold, until the threshold value does not change any more.

Then, the objects present in the binary image are labeled and the largest is selected. If the largest object is smaller than a certain threshold, the second largest object is also selected. All selected objects are then copied to a new image. Spurs at the edge of the binary objects are removed by morphological opening and a closing fills holes. The resulting image, in general, contains only one object, of which its bounding box is measured and used as the book paper edge. Gaps may appear in the final paper area mask (e.g., due to a picture not removed), but do not affect the bounding box of the object.

In a next step the center of the book is determined (the book spine location). Two images are used for that purpose: the input image isodata thresholded as described above, and a processed image closed, e.g., by using an 11×11 pattern and filtered by a 3×3 Sobel filter. Then, several candidates for book center are calculated by finding those columns in the isodata thresholded image where the number of pixel transitions (from black to white or vice versa) drops below 25. From these candidates, the center is selected by finding the maximum sum of pixels in a column of the Sobel-filtered image.

It has been noted that, as this step needs a deskewed original, this step (especially the book center location) will fail if deskewing fails. Hence a reliability factor for this step may be dependent on parameters of the deskewing step. The reliability factor is applied to detect if the processed image is an outlier and needs operator approval or adjustment.

During processing the text area location on the scan image may be determined. This section describes the step needed to register the text areas of the book pages. The values calculated may be used for cutting the page images from the scan image without any black borders, or to guide OCR or page number recognition. A basic algorithm only uses the number of transitions of rows and columns. A quality improvement can be made by using layout analysis algorithms. The input image is the black and white deskewed image, generated in the deskewing step above.

Figure 6:
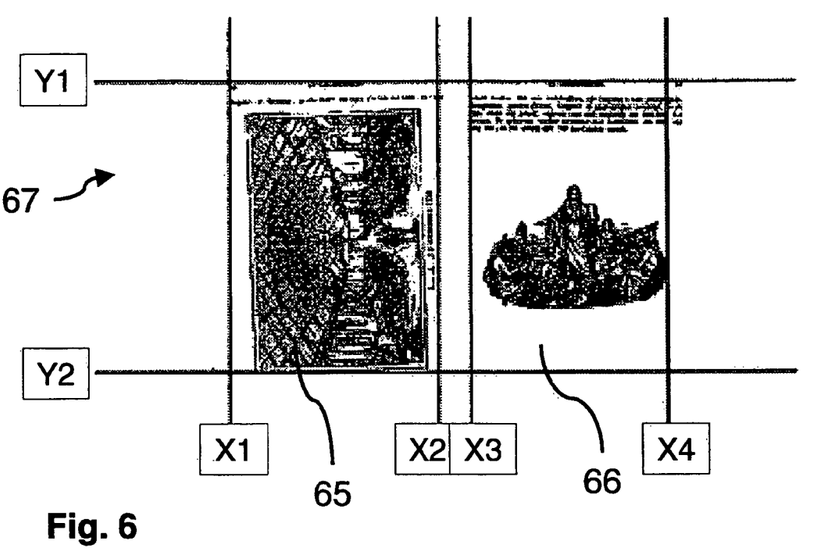

FIG. 6 shows the result of detecting a text area location. The Figure shows a scan image 67 and six image parameters indicating the text area location, each parameter X1, X2, X3, X4, Y1, Y2 indicating a proposed border of a text area. Two text areas 65,66 are defined by the six coordinate values, where the y-coordinates Y1, Y2 of the left text area 65 and right text area 66 are equal as depicted in the Figure. Starting from the top of the scan image, the number of transitions on each row is calculated. When this number exceeds 15, Y1 of the text area is found. For Y2, the same method is used. Finding the left and right boundaries of the text areas of both pages may be more difficult. This is caused by the fact that pages may contain only a few lines of text. The first occurrence of more than 5 transitions from the left defines X1. Position X4 is located by the first occurrence of more than 15 transitions in a column, starting from the right and more than 25 transitions at a position of 30 pixels more to the left. Position X2 is located by the first occurrence of less than 5 transitions and less than 5 transitions at a position of 10 pixels more to the right. The search starts at ¼ of the width of the scan image, towards the right. Position X3 is located by the first occurrence of less than 5 transitions and less than 5 transitions at a position of 10 pixels more to the left. The search starts at ¾ of the width, towards the left. Due to the straightforward approach, this step may have errors. At least a deskewed image and some text is required on the page. Some common errors are that X1, X2, X3 or X4 cut through some text, page numbers are cut off, text in between X2 and X3, or effects caused by empty pages. An error detection step detects if the result has to be considered an outlier, by calculating parameters indicating the probability of such errors. For example empty pages can be detected. If objects in the space between X2 and X3 are detected, the X2 or X3 lines may be moved accordingly to solve the problem or the result may be classified as an outlier to be displayed to the operator.

In the outlier detection unit an error detection step calculates the likelihood of an error of the preceding processing steps, for example based on the reliability factors produced by the preceding processing steps, e.g., the deskewing reliability factor based on the histogram quality. Various parameters may be used for detecting outliers, such as paper width, spectral properties of certain areas (text or figures), qualities in different domains like angles, object sizes, colors, whiteness or contrast, etc. The outlier detection unit may also determine additional properties of the page image, e.g., outliers in the widths of the text areas, text area location with respect to the paper, etc. All parameters or properties may be compared with statistical knowledge of the multi-page document gathered during processing, or with prior knowledge automatically assumed or entered by an operator.

In an embodiment the outlier detector is capable of detecting outliers in the text area width by assuming regularity on the widths of the text areas of the pages. Note that the top and/or bottom of the left and right text areas may be assumed equal, or may be assumed different and processed separately. The method used for detecting outliers in the text area width is described by the formula that detects an outlier if:

$$\frac{\text{abs}(p - M_p)}{\text{Median}(\text{abs}(p - M_p))} > \text{treshold}$$

where $\rho$=text area width and Mp is the median of the text area widths. The median is used because there can be very large outliers (for example an empty page with zero width) that would affect the mean value too much. The threshold may be adjusted by the operator to find a practical value that substantially detects all errors in text area width or location. In a practical case for a normal book, a threshold value of 14 has proven to give good results.

Possible errors detected by the outlier function are subsequently displayed for the operator to be adjusted manually via a user interface.

The user interface may have the following options to accept or adjust a proposed page image, e.g., a menu or tool bar function on the display screen. The user can perform the functions by selecting one of the buttons below an image page currently inspected:

Orientation: manually deskewing by drawing a line that should be horizontal in the book page, or indicate a rotation over 90 or 180 degrees.

Paper area: the selection of a rectangle containing the paper area.

Paper middle: the selection of the book spine location.

Left page: the selection of a rectangle containing the text area of the left page.

Right page: the selection of a rectangle containing the text area of the right page.

Go to the next scan that is suspected to be incorrect, or just to the next scan in line, if no error detection is used.

All functions can be performed as many times as necessary on the same image. In the output document actions the operator's performance may be recorded, so reviewing is possible. Hence skipping a scan marked as outlier is not permanent and can be offered in a restart. In case the user performs a manual deskewing, a new gray image may be saved separately.

Finally the image pages are cut out from the scan image, taking any deskewing into account. A dual scan image is cut into two page images at the text area borders, increased with 35 pixels on all sides. This is done to prevent a close shave, resulting in missing little parts of characters and images. It does not affect the registration of the images. Finally a file is constructed containing the page images as cut out of the sequence of scan images. The file may be provided with bookmarks and page numbers corresponding to the original multi-page document, and may be used for optional processing such as adaptive background correction or optical character recognition (OCR).

A further method for processing a multi-page document accommodates generating a logical structure in the sequence of page images generated. Basically a set of scan images of a single, multi-page document is converted into a composite set of page images, which may, for example, be a single document file. However, the original multi-page document usually has a logical structure like chapters or sections, or may include annexes. The original structure is converted to a similar structure in the composite set, i.e. indicating logical parts of the set corresponding to ranges of pages in the multi-page document. It is noted that the logical structure may be detected automatically, e.g., from the page numbering, or from graphical layout features such as chapter titles in a bold and enlarged font.

For indicating the logical structure, the scanner or processing unit may provide options for an operator to create the logical structure in the scanned document. Hence the method includes receiving commands from the operator for indicating the structure to be assigned to the sequence of page images. The commands may be given during scanning the multi-page document. A special button may be pressed to before and/or after scanning a part of the multi-page document to indicate that a respective subset of scan images constitutes a logical part of the composite set of page images. Names of bookmarks may be generated automatically, e.g., an import set number, followed by start and end page numbers. Hence structured multi-page documents may be scanned efficiently while at the same time generating a logical structure in the converted sequence of page images.

Figure 7:
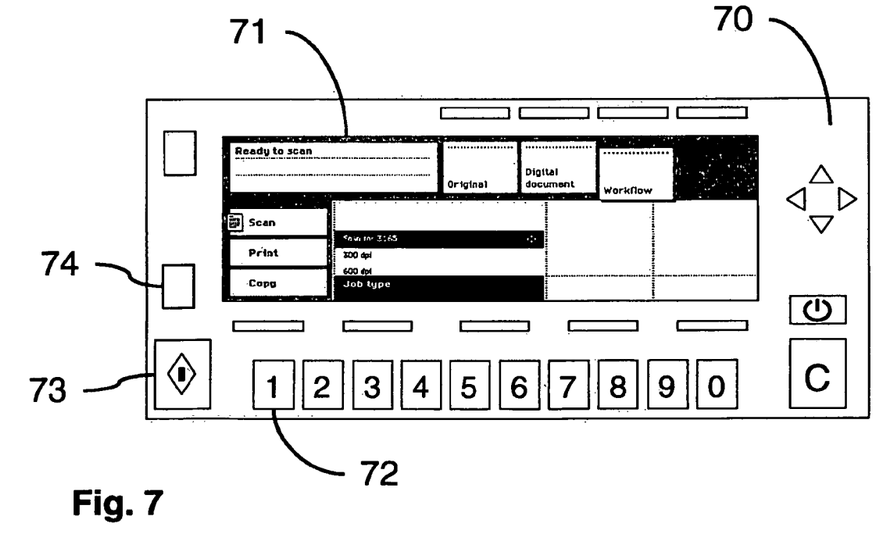
FIG. 7 shows a user interface.

FIG. 7 shows a user interface. A user interface unit 70 has a number of buttons or keys 72 and a display screen 71 to provide visual data to an operator. The display 71 is of sufficient size and resolution to display a page image resulting from a scan, or at least a part of the image sufficiently large to judge and adjust the quality of the proposed page image as described above.

In particular the user interface 70 has an IMPORT button 74 and a START button 73. The START button may also be named an OPEN/CLOSE button. The START button opens or closes any scanning operation, while the IMPORT button appends scan images of a part of a multi-page document to an existing set. The originals of the respective part may be placed as loose sheets in an automatic document feeder (ADF), or may be provided manually by an operator placing subsequent pages of a book or dossier on the platen. After scanning such a part, the operator may again press the IMPORT button to append a further part, and at the same time defining a bookmark in the document file for the part just closed. Finally the process may be ended by pressing the START button, and the logical structure of the digital version of the document will be completed.

In addition the user interface may be provided with a special button or menu function to indicate that a logical part starts or ends on a left or right page of a dual scan image.

Although the invention has been mainly explained by embodiments for scanning a book, it is to be noted that the invention is suitable for any multi-page document processing. Furthermore, next to a company environment, document processing may be on any scale, such as at home for a consumer or as a public commercial service. Also, the method of generating a logical structure in the sequence of page images generated may be applied separately. It is noted, that in this document the use of the verb 'comprise' and its conjugations does not exclude the presence of other elements or steps than those listed and the word 'a' or 'an' preceding an element does not exclude the presence of a plurality of such elements, that any reference signs do not limit the scope of the claims, that the invention and every unit or means mentioned may be implemented by suitable hardware and/or software and that several 'means' or 'units' may be represented by the same item. Further, the scope of the invention is not limited to the embodiments, and the invention lies in each and every novel feature or combination of features described above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of processing a multi-page document which comprises,
   receiving scan images by optically scanning a sequence of pages of the multi-page document,
   processing each scan image to generate a sequence of page images corresponding to original pages of the multi-page document,
   automatically determining target criteria for image parameters based on a combination of page properties of each page image of the sequence of page images derived during the processing of the scan images,
   for each page image, checking to determine if the image parameters of a page image are according to the target criteria, and
   if so, automatically accepting the page image, and
   if not, displaying the page image to an operator for corrective action or accepting the page image.

2. The method as claimed in claim 1, wherein the determining of the target criteria comprises statistically determining a target range for at least one of the image parameters based on page properties derived during the processing of the scan images.

3. The method as claimed in claim 2, wherein the image parameters comprise paper size or text area location or dimension.

4. The method as claimed in claim 1, wherein the step of detecting if the image parameters are according to the target criteria comprises calculating a reliability factor indicating the reliability for an adjustment made to generate the page image.

5. The method as claimed in claim 4, wherein the step of processing the scan images comprises detecting page orientation to generate an upside of page image from a differently oriented scan image.

6. The method as claimed in claim 5, wherein the step of detecting page orientation comprises detecting text and determining properties of the text, in a particular case determining the ratio of ascenders and descenders, or determining the orientation of selected characters.

7. The method as claimed in claim 1, wherein the image parameters comprise text line orientation and the step of processing each scan image comprising detecting a text line orientation and correcting a skew of the scan image in dependence of the detected text line orientation.

8. The method as claimed in claim 1, wherein the target criteria is dependent on prior knowledge about documents for predefined parameters of the pages of the multi-page document.

9. The method as claimed in claim 1, wherein the step of processing each scan image comprises detecting a book spine in a multi-page document and generating two page images from a single scan image.

10. The method as claimed in claim 9, wherein the step of processing each scan image comprises, independently detecting, for each of said two page images, the text line orientation and correcting a skew of the scan image in dependence on the detected text line orientation.

11. The method as claimed in claim 1, which comprises building a composite set of page images, the composite set having logical parts corresponding to ranges of pages in the multi-page document.

12. The method as claimed in claim 11, which includes receiving a command from the operator for indicating that a subset of scan images constitutes a logical part of the composite set of page images.

13. A non-transitory computer readable medium having embodied thereon a computer program product for processing a multi-page document, which comprises a plurality of code segments for causing a processor to perform the steps of claim 1.

14. A document processing system comprising:

a scanner unit for generating scan images from optically scanning a sequence of pages of a multi-page document, a user interface unit and an image processor unit for processing each scan image to generate a sequence of page images corresponding to original pages of the multi-page document, wherein the document processing system comprises outlier detection means for determining target criteria for image parameters based on a combination of page properties of each page image of the sequence of page images derived during the processing of the scan images, for each page image checking to determine if the image parameters of a page image are according to the target criteria, and if so, automatically accepting the page image, and if not, displaying the page image to an operator for corrective action or accepting the page image via the user interface unit.

15. The system as claimed in claim 14, wherein the outlier detection means is arranged for determining said target criteria by statistically determining a target range for at least one of the image parameters based on page properties derived during the processing of each scan image.

16. The system as claimed in claim 14, wherein the image processor unit is arranged for building a composite set of page images, the composite set having logical parts corresponding to ranges of pages in the multi-page document.

17. The system as claimed in claim 16, wherein the user interface unit is arranged for receiving a command from the operator for indicating that a subset of scan images constitutes a logical part of the composite set of page images.

18. The system as claimed in claim 14, wherein the system includes a printer unit for printing the page images.

\* \* \* \* \*